(12) United States Patent
Tu et al.

(10) Patent No.: US 12,293,208 B2
(45) Date of Patent: May 6, 2025

(54) DEVICE EMULATION IN REMOTE COMPUTING ENVIRONMENTS

(71) Applicant: Omnissa, LLC, Mountain View, CA (US)

(72) Inventors: Zhongzheng Tu, Beijing (CN); Joe Huiyong Huo, Beijing (CN); Mingsheng Zang, Beijing (CN); Jinxing Hu, Beijing (CN); Yueting Zhang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 617 days.

(21) Appl. No.: 17/644,601

(22) Filed: Dec. 16, 2021

(65) Prior Publication Data

US 2023/0195491 A1    Jun. 22, 2023

(51) Int. Cl.
    *G06F 9/451*     (2018.01)
    *G06F 9/455*     (2018.01)
    *H04L 67/025*    (2022.01)

(52) U.S. Cl.
    CPC .......... *G06F 9/45558* (2013.01); *G06F 9/452* (2018.02); *H04L 67/025* (2013.01); *G06F 2009/45595* (2013.01)

(58) Field of Classification Search
    CPC ................ G06F 9/45558; G06F 9/452; G06F 2009/45595; H04L 67/025
    See application file for complete search history.

(56) References Cited

U.S. PATENT DOCUMENTS

| | | | | |
|---|---|---|---|---|
| 9,697,144 B1* | 7/2017 | Chen | | G06F 9/455 |
| 10,430,371 B1* | 10/2019 | Vajravel | | G06F 9/452 |
| 10,616,559 B1* | 4/2020 | Verma | | H04N 13/246 |
| 2002/0013948 A1* | 1/2002 | Aguayo, Jr. | | H04N 21/43615 |
| | | | | 348/E7.071 |
| 2010/0269135 A1* | 10/2010 | Hulse | | H04N 21/4782 |
| | | | | 715/764 |
| 2012/0284632 A1* | 11/2012 | Baird | | G06F 9/452 |
| | | | | 715/749 |
| 2018/0267918 A1* | 9/2018 | Raju | | G06F 13/4072 |
| 2020/0192539 A1 | 6/2020 | Li et al. | | |
| 2021/0044976 A1* | 2/2021 | Avetisov | | G06F 21/64 |

\* cited by examiner

*Primary Examiner* — April Y Blair
*Assistant Examiner* — Jonathan R Labud
(74) *Attorney, Agent, or Firm* — Kim & Stewart LLP

(57) ABSTRACT

The disclosure provides an approach for device redirection in a remote computing environment. Embodiments include receiving, at a remote device from a client device over a network, input data of a peripheral device associated with the client device. Embodiments include receiving, at an emulated device running on the remote device, a request for device data from an application running on the remote device. Embodiments include responding, by the emulated device to the application, to the request with a response message having a format associated with the request, the response message being based on the input data. Embodiments include transmitting, from the remote device to the client device over the network, image data representing the application running on the remote device as controlled based on the input data.

20 Claims, 5 Drawing Sheets

DEVICE EMULATION IN REMOTE COMPUTING ENVIRONMENTS

BACKGROUND

In a virtual desktop infrastructure (VDI) environment, a local client device can access and display a remote virtual or physical desktop or remote application that is running on a remote device. For instance, a virtual desktop may be hosted on a central infrastructure known as a VDI, and may be rendered on a client device using a remote display protocol. At the client device, a user may interact with the virtual desktop using peripheral devices (e.g., keyboard and mouse, pen, etc.) associated with the client device, and operating system (OS) events generated based on the user's inputs may be redirected from the client device to the remote device on which the virtual desktop is actually running.

Event redirection from a client device to a virtual desktop involves transmission over a network on an ongoing basis as the user interacts with the virtual desktop displayed on the client device. In particular, certain conventional techniques involve the remote device on which the virtual desktop is located sending universal serial bus (USB) request block (URB) requests to the client device and the client device providing URBs indicative of inputs received via a peripheral device to the remote device in response to the URB requests. As such, redirection of the peripheral device data involves a substantial amount of network traffic, which may result in latency and poor performance, such as due to lag. Any network connection issues (e.g., if the network connection is throttled or otherwise operates at a reduced speed) may result in delayed event redirection and, consequently, additional lag between user inputs and corresponding responses within the virtual desktop. Such lag may significantly reduce the ability of a virtual desktop or other remotely-located application to function as intended. Furthermore, conventional techniques for event redirection generally require root permission on the remote device in order to prevent the host OS on the remote device from hijacking data related to the peripheral device on the client device, and interfering with the ability of the virtual desktop or other application to handle this data. However, there are some cases where an OS does not allow an application to run in root or administrator mode.

Accordingly, there is a need in the art for improved techniques for redirecting peripheral device data from a client device to a remote device for use by a virtual desktop or other application located on the remote device.

SUMMARY

A method of device redirection in a remote computing environment is provided. The method includes: receiving, at a remote device from a client device over a network, input data of a peripheral device associated with the client device; receiving, at an emulated device running on the remote device, a request for device data from an application running on the remote device; responding, by the emulated device to the application, to the request with a response message having a format associated with the request, the response message being based on the input data; and transmitting, from the remote device to the client device over the network, image data representing the application running on the remote device as controlled based on the input data.

Further embodiments include a non-transitory computer-readable storage medium storing instructions that, when executed by a computer system, cause the computer system to perform the method set forth above. Further embodiments include a computing system comprising at least one memory and at least one processor configured to perform the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
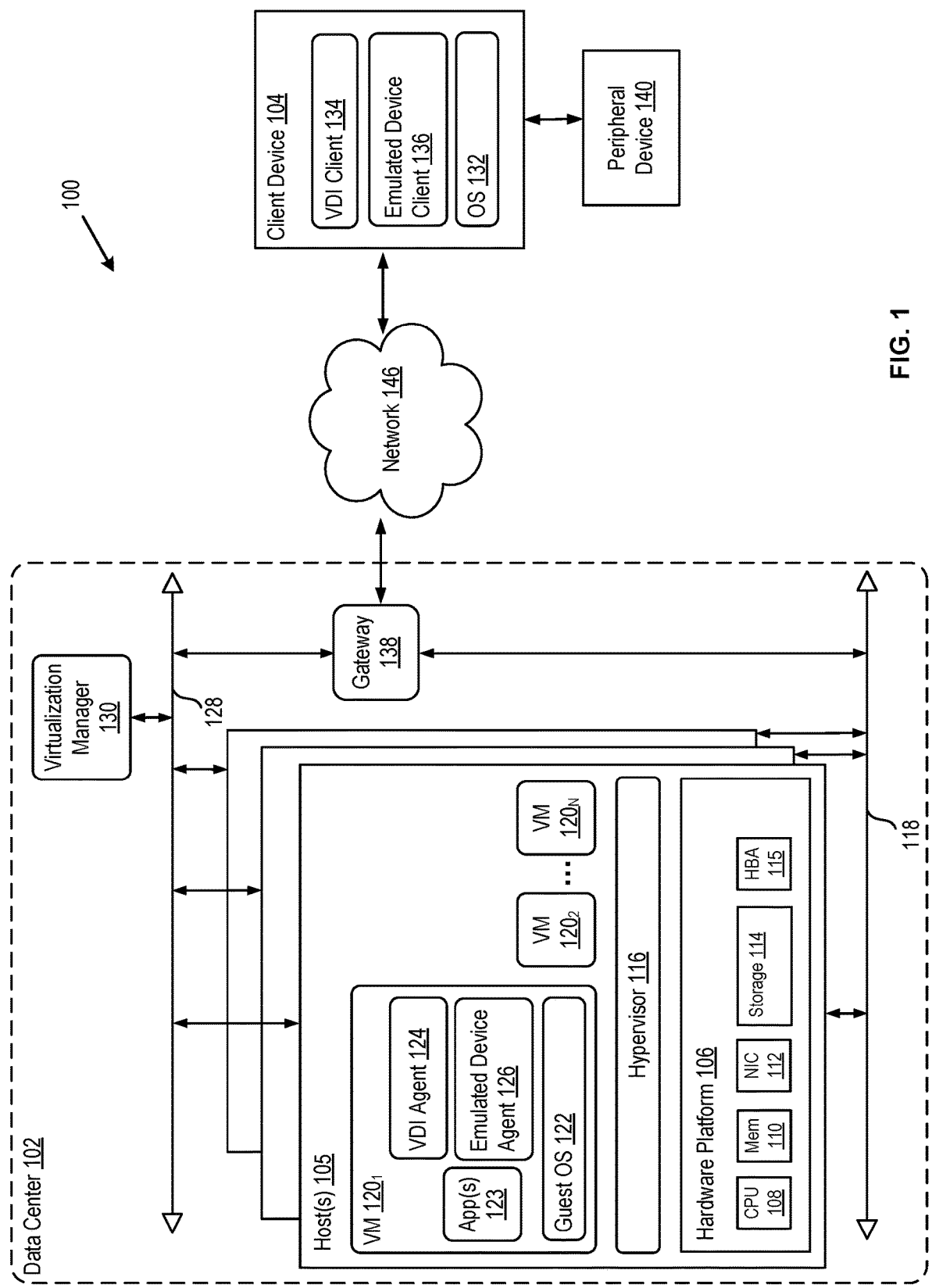
FIG. 1 depicts a block diagram of a virtualized desktop infrastructure system in which one or more embodiments according to the present disclosure may be implemented.

The present disclosure provides an approach for device redirection in a remote computing environment. In some cases, event redirection is used to redirect user input provided via peripheral devices from a client machine to a virtual desktop residing on a remote machine, such as via communication between a virtual desktop infrastructure (VDI) client on the client machine and a VDI agent on the remote machine. Certain techniques for event redirection, such as operating system (OS) event redirection, in a VDI environment is described in more detail in U.S. patent application Ser. No. 16/444,840, the contents of which are incorporated by reference herein in their entirety.

However, conventional techniques for event redirection may involve the transmission of a substantial amount of information over a network between the client machine and the remote machine, such as URB requests and URBs, including URB headers and input data of a device (e.g., business data, such as indicating inputs received by the device), sent in response to the URB requests. Accordingly, as described in more detail below with respect to FIG. 3, delays may be introduced due to this network traffic, particularly in cases where a network connection is experiencing high amounts of latency. As such, techniques described herein involve creating an emulated device on the remote machine based on information about a peripheral device associated with the client machine, transmitting input data of the peripheral device from the client machine to the emulated device on the remote machine, and allowing applications on the remote device to request data related to the peripheral device from the emulated device.

In an example, a peripheral device such as a mouse, keyboard, camera, sensor, pen, touch pad, satellite-based positioning system, scanner, microphone, virtual reality or augmented reality headset, and/or the like is connected to a client machine. A user accesses a remote application, such as a virtual desktop located on a remote machine, via a client application on the client machine (e.g., involving communication between a VDI client and a VDI agent), and wishes to provide input to the remote application via the peripheral device. According to certain embodiments, rather than using conventional event redirection techniques, an emulated device corresponding to the peripheral device is created on the remote machine. An emulated device is a virtual representation of a physical device that mimics the behavior of the physical device by receiving and responding to requests (e.g., URB requests) from applications for device data, such as based on input data received from the physical device that it is emulating.

In certain embodiments, an emulated device is created in a guest operating system (OS) of a virtual computing instance (VCI) on the remote machine by an emulated device agent running on the VCI based on information about the peripheral device received from the client machine, such as the type of the device, the driver of the device, protocols supported by the device, and/or the like.

After the emulated device is created, input data of the peripheral device (e.g., indicating inputs received via the peripheral device) is sent from the client machine to the remote machine, where it is converted by the emulated device into URBs. As described in more detail below with respect to FIG. 4, the input data is sent from the client machine to the remote machine without URB headers and without being requested via URB requests, thus significantly reducing the amount of data transmitted over the network. Applications on the remote machine can send requests for device data to the emulated device, such as via URB requests, and receive the input data in response, such as in the form of URBs, without such requests needing to be transmitted over the network. Accordingly, techniques described herein reduce lag and improve performance when utilizing peripheral devices associated with a client machine to provide input to a remotely located application. Furthermore, unlike conventional device redirection techniques, creating and utilizing an emulated device as described herein does not require root permission on the remote machine. As such, techniques described herein provide improved device redirection, particularly in cases where network latency is high and/or root permission is not available on the remote machine.

It is noted that while certain examples described herein involve USB devices and URBs, techniques described herein may be employed for other types of peripheral devices. Furthermore, a non-USB physical device may be emulated as a USB device on the remote machine. For example, input received by an inter-integrated circuit (I2C) device attached to a client machine may be redirected to a remote machine via an emulated USB device created on the remote machine that corresponds to the I2C device.

FIG. 1 depicts a block diagram of a virtualized desktop infrastructure (VDI) system 100 in which one or more embodiments according to the present disclosure may be implemented. VDI system 100 comprises at least one client device 104 and a data center 102, connected by a network 146. Network 146 may be, for example, a direct link, a local area network (LAN), a wide area network (WAN) such as the Internet, another type of network, or a combination of these.

Client device 104 is a physical device, such as a general purpose desktop computer or mobile computer. A mobile computer may be, for example, a laptop, a mobile phone, or a tablet computer. Client device 104 includes VDI client 134, OS 132, and emulated device client 136. In certain embodiments, VDI client 134 and emulated device client 136 run on top of OS 132. OS 132 may be a standard, commodity operating system.

VDI client 134 is a user-side interface of a virtualized desktop running on one of virtual machines (VMs) 120. Though certain aspects are described herein with respect to a virtual desktop running on a VM, the techniques may similarly be used for a virtual desktop or application running on other types of VCIs, such as containers, or on physical computing devices. As used herein, a "virtualized desktop" or "remote desktop" is a desktop running on, for example, one of VMs 120 that is displayed remotely on client device 104, as though the remote desktop were running on client device 104. By opening VDI client 134, a user of client device 104 accesses, through network 146, a remote desktop running in remote data center 102, from any location, using client device 104. Frames of the remote desktop running on VM 120 are transmitted to VDI client 134 using a desktop delivery protocol such as VMware® Blast™ or Microsoft® Remote Desktop Protocol (RDP)™.

After transmission, the frames are displayed on client device 104 for interaction by the user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

As the user interacts with the virtual desktop, such as using a mouse and keyboard and/or other peripheral devices, the user input events may be redirected by VDI client 134 to VDI agent 124. According to certain embodiments, data from certain peripheral devices, such as peripheral device 140, is redirected via device emulation. Peripheral device 140 is a device connected to client device 104 by which input is provided.

Emulated device client 136 generally performs operations related to device redirection. In one embodiment, emulated device client 136 is a plugin installed in client device 104, such as within VDI client 134. As described in more detail below with respect to FIG. 2, emulated device client 136 may receive information about peripheral device 140, such as through interaction with a device application programming interface (API) associated with OS 132, and may send the received information to VDI client 134, which VDI client 134 may send to VDI agent 124 for transmission to emulated device agent 126. Furthermore, emulated device client 136 may receive input data from peripheral device 140 on an ongoing basis (e.g., whenever such data is available) and send the input data to emulated device agent 126 (e.g., through VDI client 134 and VDI agent 124) for use by an emulated device created by emulated device agent 126.

It is noted that while emulated device client 136 is depicted separately from VDI client 134, emulated device client 136 may alternatively be included within VDI client 134.

Data center 102 includes host(s) 105, a virtualization manager 130, a gateway 138, a management network 128, and a data network 118. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs 120₁ to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. One example of a hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123, a VDI agent 124, and an emulated device agent 126. Application(s) 123, VDI agent 124, and emulated device agent 126 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the remote desktop, which application(s) 123 are running on and/or displayed on the remote desktop of VM 120, and other information.

Emulated device agent 126 performs operations related to creation and management of emulated devices. In one embodiment, emulated device agent 126 is a plugin installed in VM 120₁, such as within VDI agent 124. As described below with respect to FIG. 2, emulated device agent 126 may receive information about peripheral device 140 from emulated device client 136 (e.g., via VDI client 134 and VDI agent 124), and may create an emulated device based on the received information. The emulated device may be installed within guest OS 122 such that the emulated device is able to respond to URB requests sent to guest OS 122 with input data related to the emulated device. Emulated device agent 126 may provide input data from peripheral device 140 (e.g., received from emulated device client 136 via VDI client 134 and VDI agent 124) to the emulated device, and the emu-lated device may use the input data to respond to URB requests from applications (e.g., one or more of applications 123).

As described in more detail below with respect to FIG. 4, once an emulated device is created in guest OS 122, input data of peripheral device 140 may be sent in a compressed form from client device 104 to host 105 over network 146 without any URB requests being sent from host 105 to client device 104 and without URB headers being included with the input data. The emulated device may convert the received input data to URBs, and may respond with the URBs to URB requests received from application(s) 123. Thus, techniques described herein may result in improved performance over conventional device redirection techniques in which URB requests and URB headers are sent over network 146.

It is noted that while emulated device agent 126 is depicted separately from VDI agent 124, emulated device agent 126 may alternatively be included within VDI agent 124.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 118 or network 128. Network interface 112 may include one or more network adapters, also referred to as Network Interface Cards (NICs). Storage system 114 represents persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as a management network 128, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual appliance (e.g., a VM) in one of hosts 105. One example of a virtualization manager is the vCenter Server™ product made available from VMware, Inc.

Gateway 138 provides VMs 120 and other components in data center 102 with connectivity to network 146. Gateway 138 may manage external public IP addresses for VMs 120, route traffic incoming to and outgoing from data center 102, and provide networking services, such as firewalls, network address translation (NAT), dynamic host configuration protocol (DHCP), and load balancing. Gateway 138 uses data network 118 to transmit data network packets to hosts 105. Gateway 138 may be a virtual computing instance, a physical device, or a software module running within host 105. Gateway 138 may include two gateways: a management gateway for management network 128 and a data gateway for data network 118.

Figure 2:
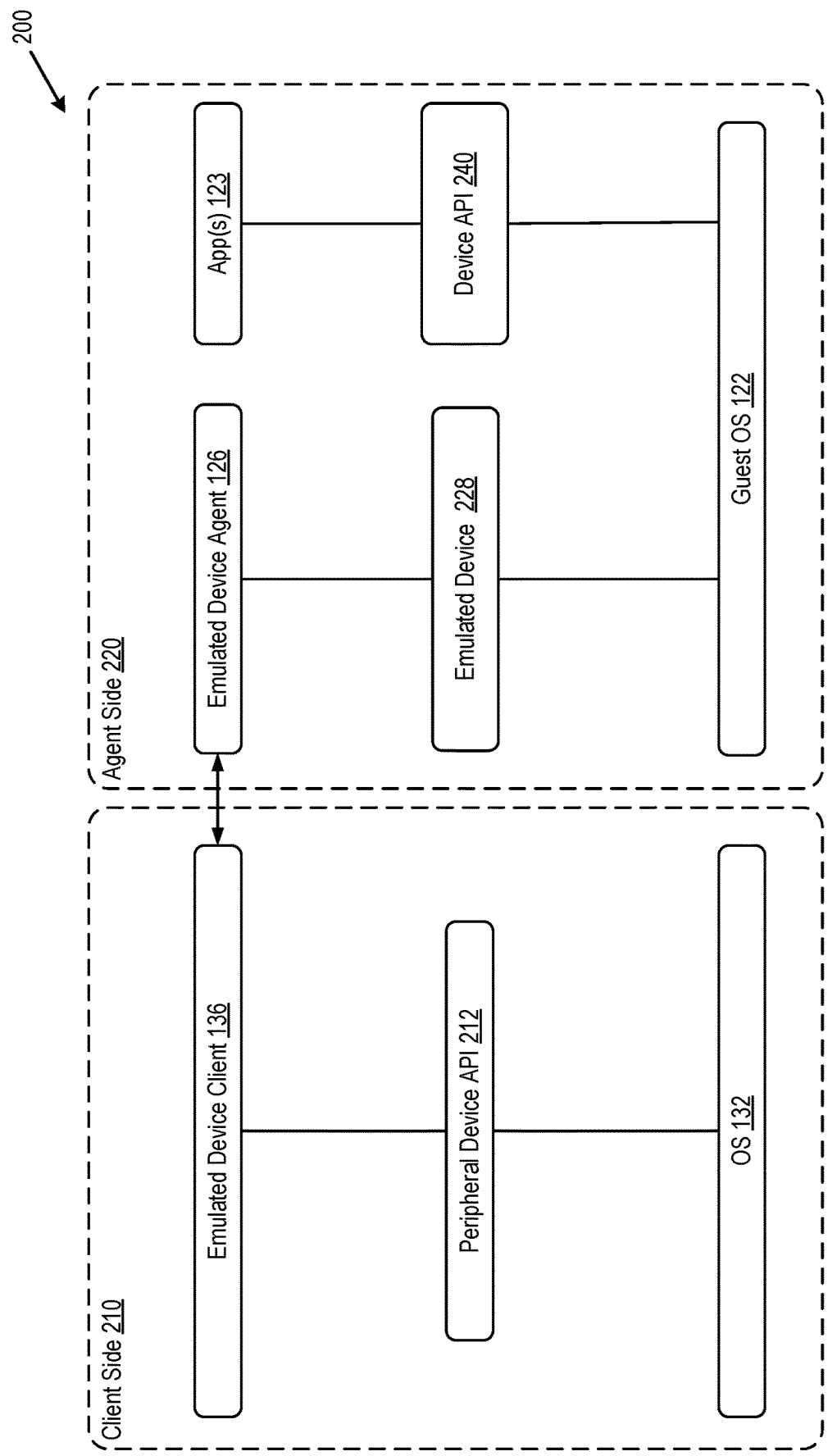
FIG. 2 is an illustration of example components related to device redirection in a remote computing environment.

FIG. 2 is an illustration 200 of example components related to device redirection in a remote computing environment. Illustration 200 includes emulated device client 136, OS 132, emulated device agent 126, application(s) 123, and guest OS 122 of FIG. 1.

On the client side 210, emulated device client 136 interacts with a peripheral device API 212 associated with OS 132 in order to retrieve information about a peripheral device. For example, emulated device client 136 may request characteristics of the peripheral device (e.g., device type, version, driver, interface (e.g., USB, Bluetooth, or the like), etc.) via peripheral device API 212 (e.g., by calling API functions). Emulated device client 136 then provides the information about the peripheral device to emulated device agent 126 on agent side 220, such as through a VDI client and a VDI agent.

Emulated device agent 126 uses the information about the peripheral device to create emulated device 228. For example, emulated device agent 126 may create a virtual device in guest OS 122 that mimics the characteristics of the peripheral device and is capable of responding to URBs with input data received from the peripheral device. In some embodiments, the same driver used for the peripheral device on client side 210 is also used for emulated device 228. Creation of emulated device 228 may involve the creation of a thread in guest OS 122 that listens for URB requests and forwards them to emulated device 228.

Once emulated device 228 is created, emulated device client 136 receives input data of the peripheral device through interaction with peripheral device API 212 and provides the input data to emulated device agent 126, which then provides the input data to emulated device 228. In some embodiments, emulated device client 136 provides all input data of the peripheral device to emulated device agent 126 as soon as it is available, while in other embodiments emulated device client 136 provides input data of the peripheral device to emulated device agent 126 at regular intervals. As described in more detail below, emulated device client 136 may provide input data of the peripheral device to emulated device agent 126 in a compressed form without a URB header, and without receiving any URB requests from agent side 220.

Emulated device 228 may convert the received input data into URBs, and may respond to URB requests using the URBs. For example, one or more applications 123 may interact with device API 240 (e.g., an API provided by guest OS 122 that includes methods for requesting data of emulated device 228) in order to send a URB request to emulated device 228, and emulated device 228 may respond to the URB request with one or more URBs generated based on the input data received from the peripheral device.

In a particular example, application 123 includes a virtual drawing canvas, and the peripheral device is a touchpad. By reducing the amount of network traffic required to redirect the user's input on the touchpad to the application 123, techniques described herein improve the functioning of the application by allowing the user's input to be reflected in real-time or near real-time (e.g., with minimal lag) on the drawing canvas displayed in the application 123, which may be viewed on client side 210 (e.g., in a virtual desktop screen).

Figure 3:
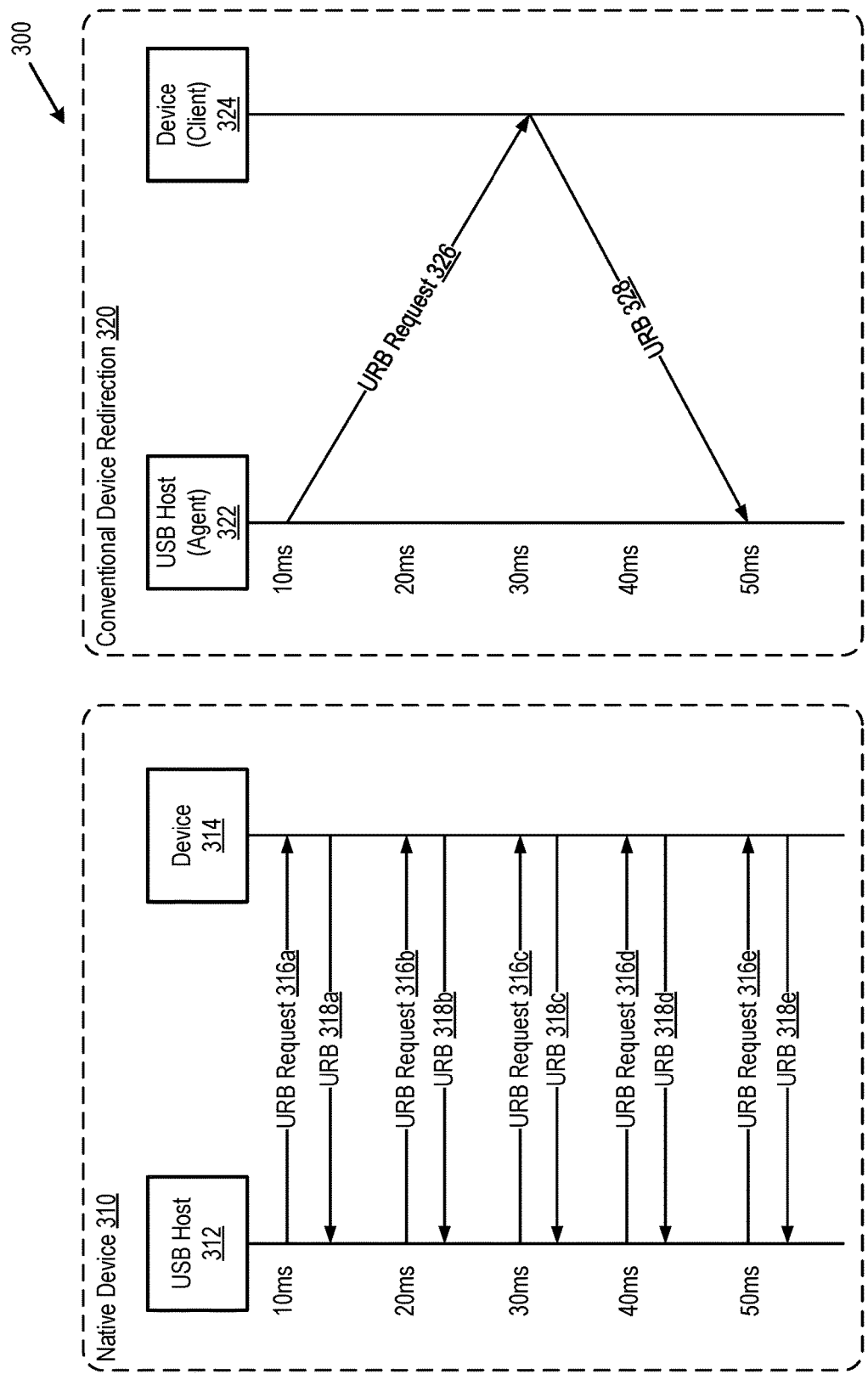
FIG. 3 is an illustration of issues with conventional techniques for device redirection in a remote computing environment.

FIG. 3 is an illustration 300 of issues with conventional techniques for device redirection in a remote computing environment. The issues described with respect to FIG. 3 are addressed by techniques described herein, such as with respect to FIG. 4.

First, with a native device arrangement 310, a USB host 312 (e.g., an application that relies on input from a USB device) sends URB requests 316a-e to a device 314 connected to the same machine as USB host 312, and the device 314 responds with URBs 318a-e. As shown, a URB request 316 is sent by USB host 312 every 10 milliseconds (which is included as an example time period), and a URB 318 is received promptly in response.

However, if the device is located on a machine remote from the USB host, techniques for device redirection must be utilized.

Thus, with conventional device redirection 320, a USB host 322 (e.g., on an agent side) sends URB requests 326 to the device 324 (e.g., on a client side) over a network, and receives URBs 328 in response. As seen in illustration 300, these conventional device redirection techniques can result in significant amounts of lag due to the network traffic required. For example, network latency may cause a URB request 326 to take 20 milliseconds to reach its destination, and may subsequently cause a URB 328 sent in response to take 20 milliseconds to reach its destination. These time periods are included as an example. Thus, from the USB host 322 sends the URB request 316, it may take 40 milliseconds for a URB 328 to be received as response. This amount of lag may substantially impair the functioning of USB host 322. For example, a user may draw on a touchpad (e.g., device 324), and may not see this input reflected in a virtual desktop screen until a certain amount of time after it is provided.

Thus, techniques described herein involve the use of device emulation, as described in more detail below with respect to FIG. 4.

Figure 4:
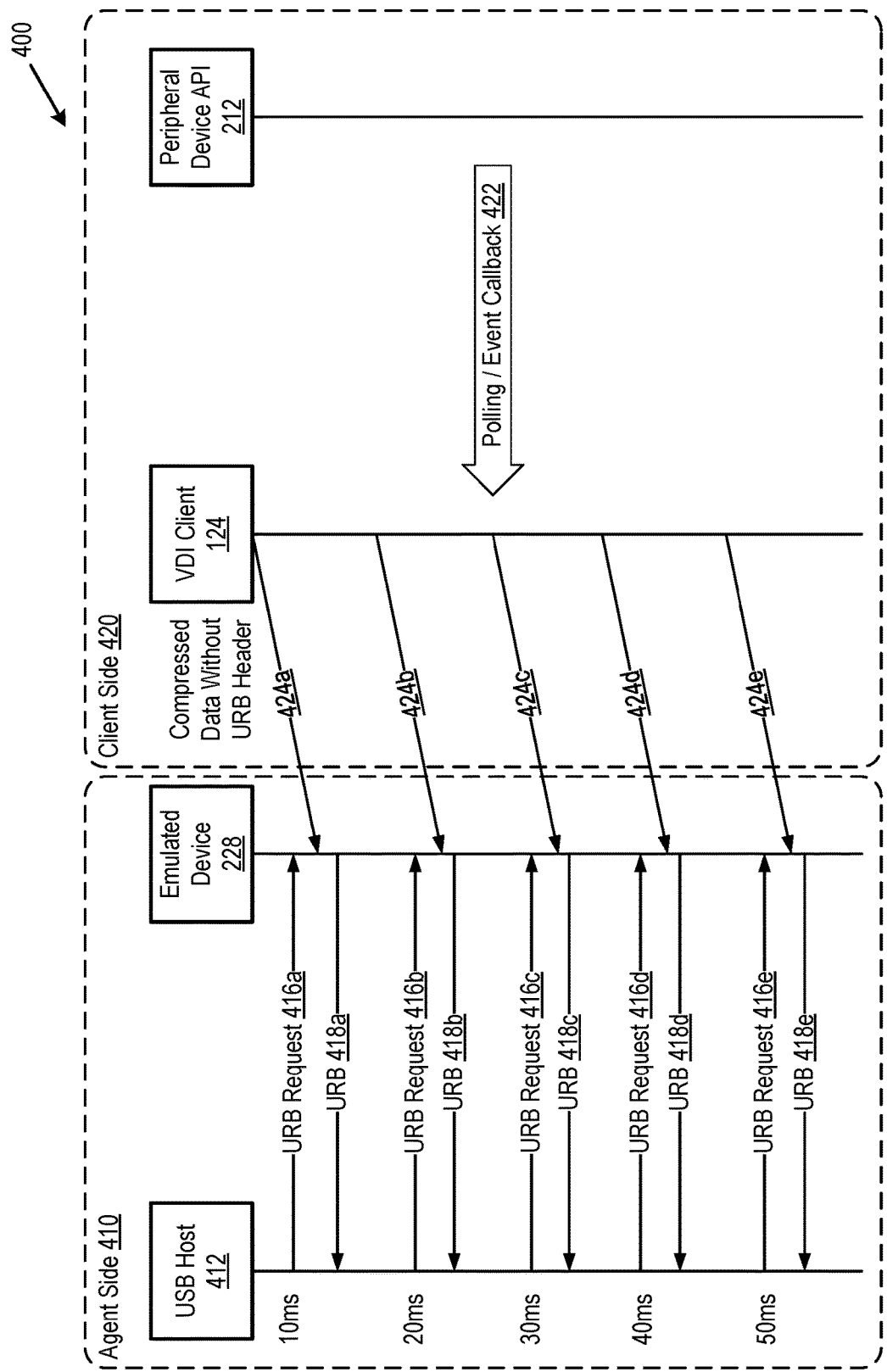
FIG. 4 is an illustration of improved techniques for device redirection in a remote computing environment, according to embodiments of the present disclosure.

FIG. 4 is an illustration 400 of improved techniques for device redirection in a remote computing environment, according to embodiments of the present disclosure. Illustration 400 includes emulated device 228 and peripheral device API 212 of FIG. 2 and VDI client 124 of FIG. 1.

On the client side 420, at 422, VDI client 124 receives input data of a peripheral device via polling or event callback from peripheral device API 212. For instance, an emulated device client associated with VDI client 124 may regularly poll for input data or may register with peripheral device API 212 in order to receive input data as it becomes available, and may provide this input data to VDI client 124. Then at 424a-e, VDI client 124 transmits the input data in a compressed form without URB headers to emulated device 228 (e.g., via a VDI agent and an emulated device agent) on agent side 410, such as over a network. By sending the input data in a compressed form without URB headers, and without requiring any URB requests to be sent from agent side 410 to client side 420, network traffic is kept to a minimum.

As such, emulated device 228 is able to respond to URB requests 416a-e from a USB host 412 (e.g., an application) with URBs 418a-e based on the received compressed input data in real-time or near real-time. As shown in illustration 400, this may result in efficient and prompt responses to URB requests (e.g., every 10 milliseconds) with timing similar to that of responses in a native device arrangement. Thus, according to techniques described herein, lag associated with conventional techniques for device redirection may be avoided or reduced, thereby improving the functioning of the system. For example, a user may draw on a touchpad on client side 420 and see the input reflected immediately in a virtual desktop screen transported to client side 420 from agent side 410.

In some embodiments input data may be batched for transmission from client side 420 to agent side 410, such as based on time intervals or other conditions (e.g., threshold amounts of data). For instance, all input data that becomes available in a given time interval (e.g., 10 milliseconds) may be transmitted (e.g., in a compressed form without a URB header) in a single message from client side 420 to agent side 410 at the end of the time interval. In another example, every time a threshold amount of input data becomes available, that input data is transmitted (e.g., in a compressed form without a URB header) in a single message from client side 420 to agent side 410. Thus, batching may further reduce the amount of network traffic between client side 420 and agent side 410, and thereby further improve the performance of the system.

Figure 5:
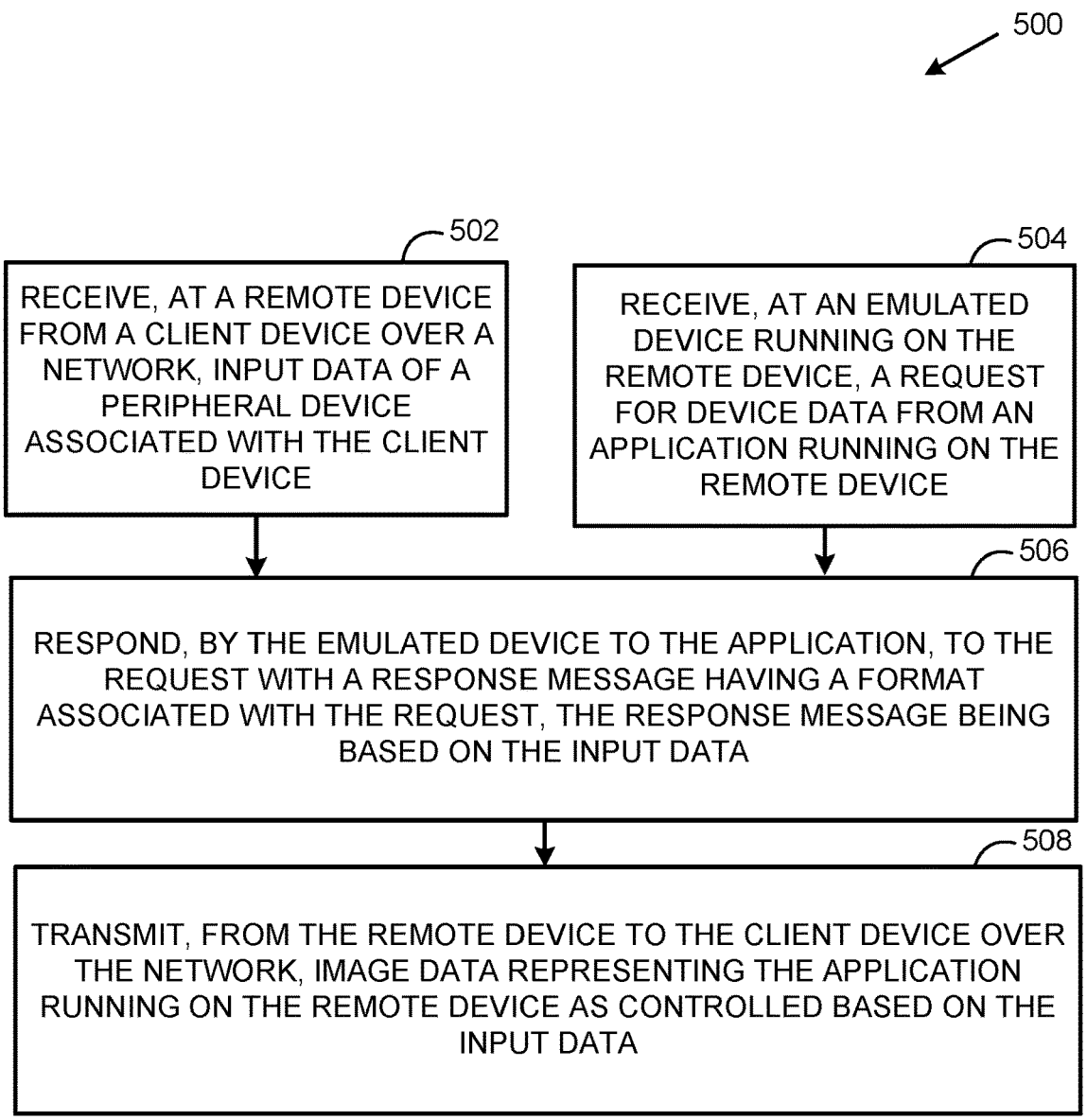
FIG. 5 depicts example operations related to device redirection in a remote computing environment.

FIG. 5 illustrates example operations 500 related to device redirection in a remote computing environment. For example, operations 500 may be performed by one or more components of client device 104 and/or host 105 of FIG. 1.

Operations 500 begin at steps 502 and 504, with receiving, at a remote device from a client device over a network, input data of a peripheral device associated with the client device and receiving, at an emulated device running on the remote device, a request for device data from an application running on the remote device. It is noted that steps 502 and 504 may be performed in any order, including simultaneously. In some embodiments, the input data is received at the remote device periodically without the remote device issuing requests periodically for the input data. In certain embodiments, the input data comprises a set of data that became available on the client device during a time interval and was batched for transmission to the remote device in a single message.

Operations 500 continue at step 506, with responding, by the emulated device to the application, to the request with a response message having a format associated with the request, the response message being based on the input data. In some embodiments, the input data comprises compressed data that is sent by the client device over the network without a universal serial bus (USB) request block (URB) header.

The input data of the peripheral device may be based on input received via the peripheral device. In some cases, the peripheral device is a USB device.

In certain embodiments, the input data of the peripheral device is sent by a client plugin associated with the emulated device on the client device to an agent plugin associated with the emulated device on the remote device. The client plugin may receive the input data from the peripheral device via an application programming interface (API) associated with the peripheral device.

In some embodiments, the request for the device data from the application comprises a universal serial bus (USB) request block (URB) request, and responding, by the emulated device, to the request from the application comprises sending one or more URBs to the application. For instance, the format may comprise a URB format, and the response message sent by the emulated device to the application may comprise the URB header.

Operations 500 continue at step 508, with transmitting, from the remote device to the client device over the network, image data representing the application running on the remote device as controlled based on the input data.

In certain embodiments, the application comprises a virtual desktop agent application, and the client device comprises a virtual desktop client application by which a virtual desktop of a virtual computing instance (VCI) is accessed on the client device through interaction with the virtual desktop agent application.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments according to the present disclosure may be useful machine operations. In addition, one or more embodiments according to the present disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments according to the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments according to the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers, each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of device redirection in a remote computing environment, the method comprising:
    receiving, at a remote device from a client device over a network, input data of a peripheral device associated with the client device, wherein the input data comprises compressed data that is sent by the client device over the network without a universal serial bus (USB) request block (URB) header;
    receiving, at an emulated device running on the remote device, a request for device data from an application running on the remote device, wherein the request comprises a URB request;
    responding, by the emulated device to the application, to the request with a response message having a format associated with the request, the response message being based on the input data, wherein the response message comprises the URB header and the format comprises a URB format; and
    transmitting, from the remote device to the client device over the network, image data representing the application running on the remote device.

2. The method of claim 1, wherein the input data is received at the remote device periodically without the remote device issuing requests periodically for the input data.

3. The method of claim 1, wherein the peripheral device is a universal serial bus (USB) device.

4. The method of claim 1, wherein the input data of the peripheral device is sent by a client plugin associated with the emulated device on the client device to an agent plugin associated with the emulated device on the remote device.

5. The method of claim 4, wherein the client plugin receives the input data from the peripheral device via an application programming interface (API) associated with the peripheral device.

6. The method of claim 1, wherein the application comprises a virtual desktop agent application, and wherein the client device comprises a virtual desktop client application by which a virtual desktop of a virtual computing instance (VCI) is accessed on the client device through interaction with the virtual desktop agent application.

7. The method of claim 1, wherein the input data comprises a set of data that became available on the client device during a time interval and was batched for transmission to the remote device in a single message.

8. A system for device redirection in a remote computing environment, comprising:
    at least one memory; and
    at least one processor coupled to the at least one memory, the at least one processor and the at least one memory configured to:
    receive, at a remote device from a client device over a network, input data of a peripheral device associated with the client device, wherein the input data comprises compressed data that is sent by the client device over the network without a universal serial bus (USB) request block (URB) header;
    receive, at an emulated device running on the remote device, a request for device data from an application running on the remote device, wherein the request comprises a URB request;

respond, by the emulated device to the application, to the request with a response message having a format associated with the request, the response message being based on the input data, wherein the response message comprises the URB header and the format comprises a URB format; and transmit, from the remote device to the client device over the network, image data representing the application running on the remote device.

9. The system of claim 8, wherein the input data is received at the remote device periodically without the remote device issuing requests periodically for the input data.

10. The system of claim 8, wherein the peripheral device is a universal serial bus (USB) device.

11. The system of claim 8, wherein the input data of the peripheral device is sent by a client plugin associated with the emulated device on the client device to an agent plugin associated with the emulated device on the remote device.

12. The system of claim 11, wherein the client plugin receives the input data from the peripheral device via an application programming interface (API) associated with the peripheral device.

13. The system of claim 8, wherein the application comprises a virtual desktop agent application, and wherein the client device comprises a virtual desktop client application by which a virtual desktop of a virtual computing instance (VCI) is accessed on the client device through interaction with the virtual desktop agent application.

14. The system of claim 8, wherein the input data comprises a set of data that became available on the client device during a time interval and was batched for transmission to the remote device in a single message.

15. A non-transitory computer-readable medium storing instructions that, when executed by one or more processors, cause the one or more processors to:

receive, at a remote device from a client device over a network, input data of a peripheral device associated with the client device, wherein the input data comprises compressed data that is sent by the client device over the network without a universal serial bus (USB) request block (URB) header;

receive, at an emulated device running on the remote device, a request for device data from an application running on the remote device, wherein the request comprises a URB request;

respond, by the emulated device to the application, to the request with a response message having a format associated with the request, the response message being based on the input data, wherein the response message comprises the URB header and the format comprises a URB format; and transmit, from the remote device to the client device over the network, image data representing the application running on the remote device as controlled based on the input data.

16. The non-transitory computer-readable medium of claim 15, wherein the input data is received at the remote device periodically without the remote device issuing requests periodically for the input data.

17. The non-transitory computer-readable medium of claim 15, wherein the peripheral device is a universal serial bus (USB) device.

18. The non-transitory computer-readable medium of claim 15, wherein the input data of the peripheral device is sent by a client plugin associated with the emulated device on the client device to an agent plugin associated with the emulated device on the remote device, and the client plugin receives the input data from the peripheral device via an application programming interface (API) associated with the peripheral device.

19. The non-transitory computer-readable medium of claim 15, wherein the application comprises a virtual desktop agent application, and wherein the client device comprises a virtual desktop client application by which a virtual desktop of a virtual computing instance (VCI) is accessed on the client device through interaction with the virtual desktop agent application.

20. The non-transitory computer-readable medium of claim 15, wherein the input data comprises a set of data that became available on the client device during a time interval and was batched for transmission to the remote device in a single message.

* * * * *